(12) United States Patent
Hailey

(10) Patent No.: US 7,015,475 B2
(45) Date of Patent: Mar. 21, 2006

(54) METHOD AND APPARATUS FOR MATERIAL IDENTIFICATION USING CHARACTERISTIC RADIATIVE EMISSIONS

(75) Inventor: Charles Hailey, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 90 days.

(21) Appl. No.: 10/840,144

(22) Filed: May 6, 2004

(65) Prior Publication Data

US 2006/0033036 A1 Feb. 16, 2006

Related U.S. Application Data

(60) Provisional application No. 60/468,376, filed on May 6, 2003.

(51) Int. Cl.
*G01N 23/00* (2006.01)
(52) U.S. Cl. ............... 250/358.1; 250/251; 250/336.1; 250/397
(58) Field of Classification Search .................. None
See application file for complete search history.

(56) References Cited

U.S. PATENT DOCUMENTS

| 5,067,616 A | 11/1991 | Plester et al. |
| 5,115,459 A | 5/1992 | Bertozzi ................ 378/88 |
| 5,164,953 A * | 11/1992 | Case et al. ............... 372/69 |
| 5,323,004 A | 6/1994 | Ettinger et al. |
| 5,420,905 A | 5/1995 | Bertozzi ................ 378/88 |
| 6,281,502 B1 | 8/2001 | Pineau et al. |

* cited by examiner

*Primary Examiner*—Nikita Wells
(74) *Attorney, Agent, or Firm*—Wilmer Cutler Pickering Hale and Dorr LLP

(57) ABSTRACT

A method and apparatus for low-background detection of simultaneously-emitted characteristic radiative emissions is presented. In some aspects, the characteristic radiative emissions, e.g. X-rays, are produced by deexcitation of exotic (excited) atoms in a sample to be identified. The characteristic X-rays can be used to identify the sample according to its unique identifying energy spectrum. In other aspects, a nuclear characteristic radiative emission is detected and used for the identification.

38 Claims, 4 Drawing Sheets

METHOD AND APPARATUS FOR MATERIAL IDENTIFICATION USING CHARACTERISTIC RADIATIVE EMISSIONS

CROSS-REFERENCE TO RELATED APPLICATION

This application claims the benefit under 35 U.S.C. 119(e) of U.S. Provisional Patent Application No. 60/468,376, filed on May 6, 2003, entitled Method and Apparatus for Material Identification Using Characteristic Radiative Emissions.

TECHNICAL FIELD

The present disclosure relates to detection and identification of materials, and in a particular example, to detecting materials by characteristic energetic radiative emissions from exotic atoms of the materials.

BACKGROUND

A unique and known electronic shell structure is associated with each atomic species of matter. The electrons populating the shell structure are associated with energies and levels of excitation described by the laws of quantum mechanics. It is known that an electronic transition from a first shell or energy state to a second shell or energy state is accompanied by a discrete emission of energetic radiation, such as photons. These radiative emissions are sometimes termed "atomic" to indicate that they correspond to atomic shell structure transitions, and include gamma rays, X-rays, visible light, and invisible photonic radiation. Other radiative emissions, sometimes termed "nuclear" emissions are due to interactions and transitions occurring within the nucleus of an atom rather than in the electronic shell structure.

It is also known that atoms may interact with or capture energetic particles, causing the atoms to become excited, forming "exotic atoms." An exotic atom is generally one which has captured a negatively-charged subatomic particle into its electronic shell structure, and can be accompanied by complex physical behavior within the electronic shell structure. Examples of subatomic particles which may cause an atom to become an exotic atom include negative muons and pions. An exotic atom may then return to its ground state by emission of one or more energetic radiative emissions, such as X-rays, having known characteristic and unique energies.

This behavior has been exploited in the past for antiparticle detection and identification. Antimatter particles were captured by one or more nitrogen atoms to create exotic nitrogen atoms, which subsequently decayed to a lower energy state. The deexcitation of a nitrogen atom released characteristic subatomic particles, which were detected using the segmented X-ray spectrometer and used to identify the antimatter particle, e.g. an antiproton. The antimatter particle was then identified by studying the unique fingerprint provided by the characteristic emitted particles as the nitrogen atom decayed from its excited exotic state to its ground state. This method is inherently fairly immune to noise, since detection of the unique characteristic X-ray spectrum is a sure indication of the type of antimatter particle that excited the nitrogen atoms.

Another application involves the use of muons in radiography. Muons are negatively-charged leptons, or "heavy electrons," known to have a small cross section for absorption in matter, and are therefore capable of penetrating materials which would otherwise be relatively opaque to traditional ionizing radiation. Because muons are deflected when penetrating dense or heavy materials rather than being absorbed, they can be used to detect the presence of such dense materials hidden within containment devices or shielded from traditional detection.

It has been suggested that a source of muons and a detector may be placed on either side of a container holding an unknown material. By using the detector to detect the deflection of the muons, it can be surmised whether dense materials are present in the container. In one application, it has been suggested that this technique could be used to detect banned materials, such as nuclear materials, hidden in shipping containers or suitcases. Others in the field have suggested that an artificial source of muons or a natural source of muons can be used for such purposes.

Subatomic particles can be generated in a laboratory or can be naturally-occurring. Artificially-generated muons are produced in accelerators, which can be room-sized according to the present state of the art. Naturally-occurring muons are created in atmospheric interactions with cosmic radiation, and are therefore sometimes called "secondary cosmic radiation."

SUMMARY

There is a present lack of methods or devices for low-background detection and localization of materials, such as dense nuclear materials contained in containers which are opaque to conventional imaging and detection devices. There also lacks a practical detector for substantially-simultaneous detection and correlation of multiple characteristic radiative emissions, such as X-rays and neutrons, which are emitted from the deexcitation of exotic atoms. Specifically, no known system or method can identify a material by the correlation of one or more characteristic radiative emissions resulting from a substantially single deexcitation sequence of one exotic atom.

One embodiment is directed to a device for detecting correlated radiative emissions from a sample, having a chamber that substantially contains the sample, the chamber being permeable to an incident subatomic particle entering the chamber and interacting with the sample, thereby causing the sample to emit a first emitted radiative emission and a second emitted radiative emission; and a detector that detects a first interaction with the first emitted radiative emission and detects a second interaction with the second emitted radiative emission.

Another embodiment is directed to a method for determining a correlation between two emitted radiative emissions and a detector, including detecting a first radiative emission from deexcitation of an exotic atom; detecting a second radiative emission from deexcitation of the exotic atom; and correlating the first and second radiative emissions to determine a correlation between the first and second radiative emissions.

Yet another embodiment is directed to a device for screening objects, including a chamber that substantially contains an object to be screened; and an X-ray detector that detects at least one characteristic X-ray emitted by an excited (exotic) atom within the object; wherein the exotic atom emits the characteristic X-ray on transitioning from a first (high-energy) atomic state to a second (low-energy) atomic state.

DETAILED DESCRIPTION

The following describes in detail one or more embodiments preferred in arriving at the method and apparatus described herein, and should not be taken as exhaustive, inclusive, or limiting.

In one aspect, a method and apparatus for simultaneous detection of simultaneously-emitted characteristic radiative emissions are presented. In some aspects, the characteristic radiative emissions, e.g. X-rays, are produced by deexcitation of exotic atoms in a sample to be identified. The characteristic X-rays are used to identify the sample according to its characteristic identifying spectrum. One application of the method and apparatus is in detecting and identifying hidden materials, such as special nuclear materials (SNM) disposed in sealed and shielded containers.

By "radiative emission" it is meant to generally include any emission emanating from the atom or its nucleus. This includes emissions traditionally considered particulate emissions as well as photonic and other radiation. Also, the radiative emission generally is of some measurable energy and can be considered energetic radiative emission, although it is not constrained to any energy band or range for the present purposes. By "characteristic radiative emission" it is generally meant that a characterizable attribute (such as energy, frequency) is associated with the radiative emission, such attribute being detectable or measurable, and characterizing the emission and/or its source in some way.

Figure 1:
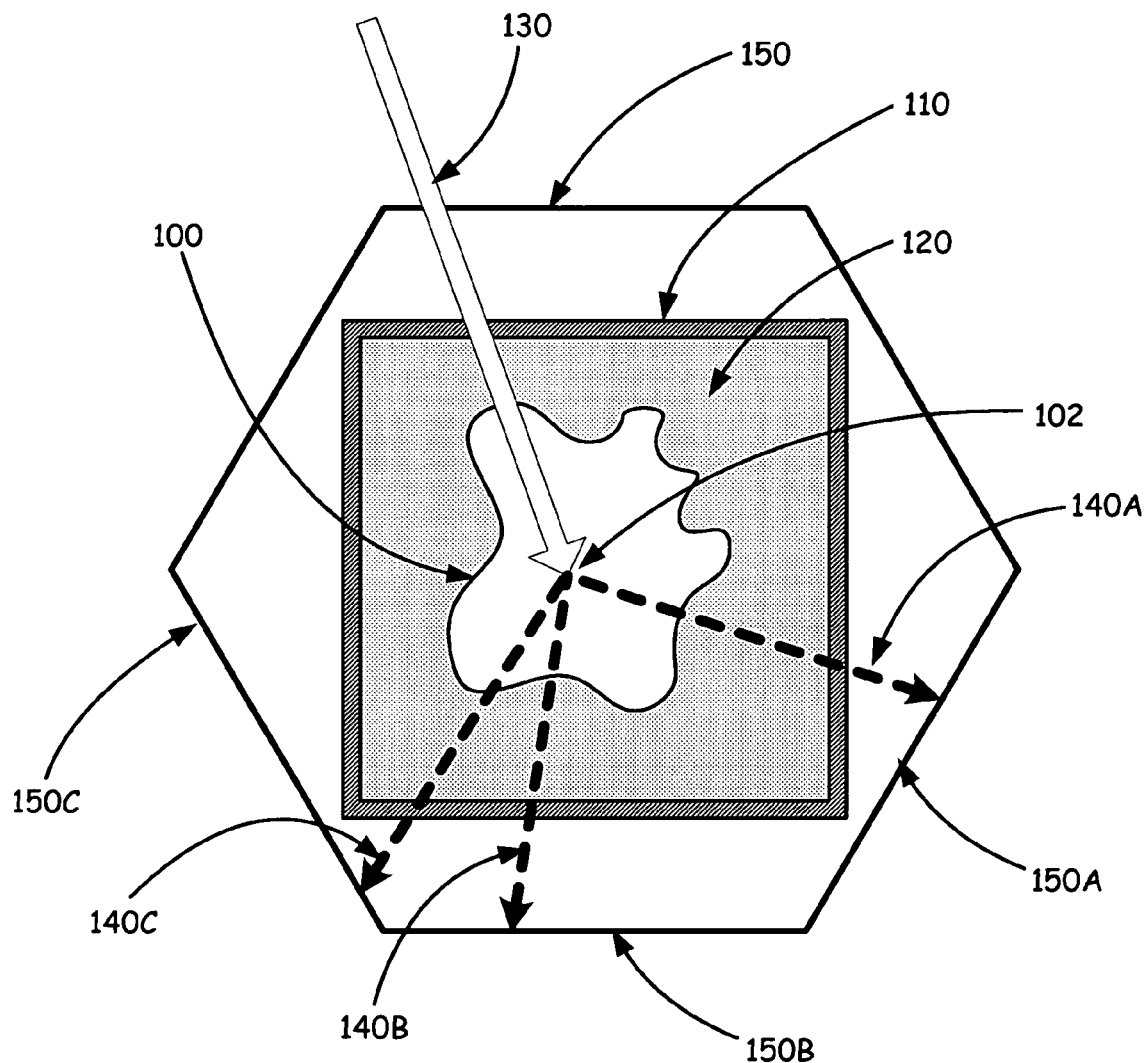
FIG. 1 illustrates an embodiment of a detector apparatus.

FIG. 1 illustrates an embodiment of a detector apparatus 10 for detecting a material sample 100 contained in a container 110. A second material 120 fills some or all of the space surrounding the sample 100 and within the container 110. For example, sample 100 comprises a nuclear material such as uranium-238. Container 110 comprises a metal casing such as a shipping container made of aluminum or steel. The sample 100 may be further enclosed by a layer of some shielding material (not shown) that may for instance be made of lead, tantalum or bismuth. The second material 120 is a packaging material, such as plastic, water, wood, etc., or includes more than one material, such as a plastic and a metal. The detector apparatus 10 is designed to allow an incident subatomic particle 130 to enter a chamber containing the container 110.

The container 110 and its contents are entirely or substantially enclosed within a detector 150. The detector 150 can be in the form of a chamber that can house a sample or a sample in a container. In one embodiment, the detector 150 is a scintillation X-ray detector formed of several segments (e.g., 150A–C). In another embodiment, the detector 150 is a liquid scintillator that detects both X-rays and neutrons.

An incident particle (a muon) 130 is captured by an atom within sample 100, forming an exotic (excited) atom 102. The atom 102 subsequently decays to a lower energy level, such as its ground state energy level, emitting a plurality of characteristic X-rays 140A–C.

Each of the characteristic X-rays 140A–C is generally emitted in a separate direction, interacts with a segment of detector 150, and imparts a signal to the detector 150 indicative of the unique energy carried by the characteristic X-ray. These signals are picked up in the detector 150 and amplified and transformed into useful electronic signals as will be described below.

Figure 2:
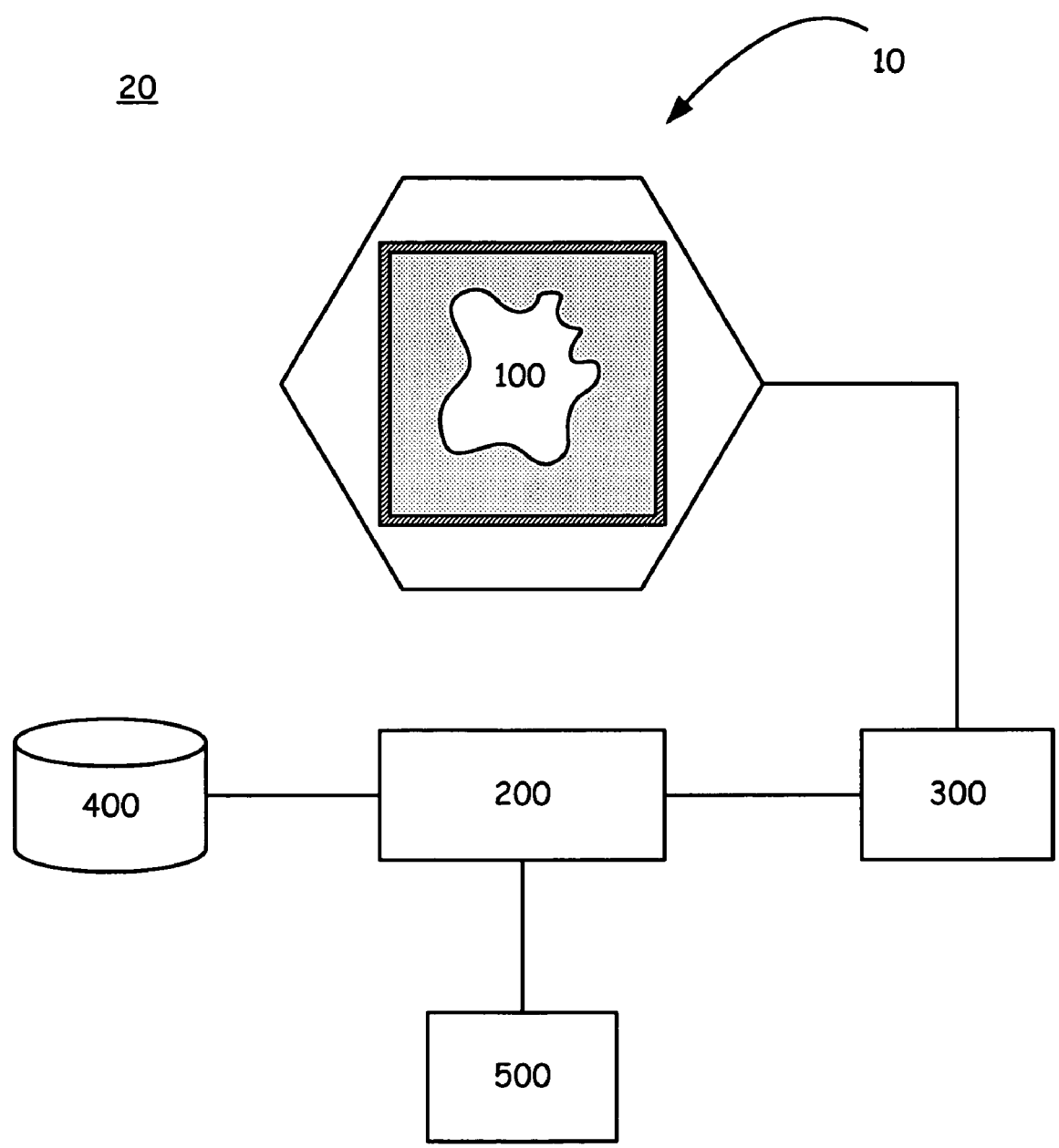
FIG. 2 illustrates an embodiment of a system for detecting and identifying materials.

FIG. 2 illustrates a system 20 including the detector apparatus 10 for detecting and identifying the material sample 100 shown in FIG. 1. Detector apparatus 10 is coupled to an X-Ray spectrometer 300, constructed and arranged to receive signals from the detector apparatus 10 and analyze a characteristic (such as energy or frequency) of the characteristic X-rays 140A–C. The spectrometer 300 is further coupled to a processor 200, such as a computer, that receives output signals from the spectrometer 300 corresponding to the detected characteristics of X-rays 140A–C. Processor 200 includes, or is coupled to a storage device 400, containing stored data indicative of characteristics of various known characteristic radiation. For example, tables of energies of characteristic radiated X-rays for each element are kept in storage device 400.

For example, processor 200, in conjunction with the output of spectrometer 300 and the data in storage device 400, executes software instructions to identify material sample 100. This is accomplished in the instant embodiment by comparing the measured energies of the characteristic radiated X-rays 140 with known X-ray energies previously loaded in a digitally-stored look-up table of such energies.

The stored information is not limited to atomic (electronic) shell radiative emissions, but can also include nuclear radiative emission data, such as data for emitted neutrons which are released following nuclear capture of the subatomic particle.

Additionally, processor 200 correlates the incoming signals from spectrometer 300 to determine which X-ray detection events are closely related in time, and would thus have resulted from the same event or exotic atom deexcitation within sample 100. The correlation is preferably a temporal window, predefined according to expected maximum delays between detection events for each of the plural emitted characteristic X-rays 140. An exemplary window is less than 10 nanoseconds in duration. In fact, the window is short enough in one embodiment so as to be determined by the geometry of the detector and the required time-of-flight of the detected radiation rather than the physics of the exotic atom deexcitation.

Once a set of detected characteristic radiative emissions 140 have been determined to be related to a same deexcitation event within sample 100, their unique energy levels are compared to those stored in the look-up table in storage device 400. A match may then be determined between the detected characteristic radiation and the stored data, indicating the identity of the atom from which the characteristic radiation was emitted.

In some instances, radiated emission from deexcited exotic atoms is scattered or otherwise interacts with other materials in the sample, packaging, shielding, detector apparatus, or general environment of the detector. These interactions can cause the unique characteristic (e.g. energy level) of the emitted radiation to change, and possibly to a value not indicative of the specific sample material 100. However, since detector 150 picks up other emitted radiations 140 from the same event, some of those other emissions will bear the unique signature of the sample material 100. Specifically, even one detected radiation 140 from the sample material 100 can be used to identify the material. The other scattered and altered radiations can be nonetheless time or space correlated with the unaltered detected radiation to make a determination as to the material 100 and to determine that the altered radiations were scattered by something other than the material 100. The resulting apparatus is thus essentially impervious to background events, and can identify a material from as little as a single detection event.

An output device 500 is coupled to processor 200 for providing results to an operator or another coupled device. Output device 500 comprises for example a computer display monitor, showing graphically and/or using an alphanumeric display the energies or the name of the identified material sample 100. Auxiliary interfaces and devices (not shown) may be further coupled to processor 200 or output device 500. As an example, an operating station may be equipped with an audible alarm activated on detection and identification of a flagged substance (e.g., nuclear material, explosives, illegal drugs, etc.). The processor can carry out a number of functions such as analysis of a measured energy value or spectrum, thereby functioning at least in part as an analyzer and/or a comparator that then compares the measured spectrum with those stored in memory.

It should be noted that material identification of the sample 100 is not restricted to elemental identification. That is, if a complex substance comprising several elements is programmed for detection, processor 200 can indicate whether the given atomic constituents of the complex substance were identified in sample 100.

Since the characteristic X-rays are emitted from the excited (exotic) atom 102 as a result of a single atomic event, they arrive at the respective segments 150A–C of the detector 150 at substantially the same time, with delays being essentially time-of-flight and/or circuit related. Furthermore, since the characteristic set of energies or lines obtained from such simultaneous X-ray emissions are unique, it is virtually impossible to mistakenly confuse one atomic species with another according to the present technique. This makes the technique exceptionally noise-free, in that a mere single atomic event is all that is required to positively identify the atomic species.

As for the incident subatomic particle 130, it can be of a highly-penetrating type, such as a muon or a pion. These particles can penetrate containers that are intended to obscure the container 110 contents from conventional screening devices, such as X-ray imaging machines. As mentioned earlier, the source of incident particles 130 may be natural or artificial. A muon source may be created from an accelerator which can be arranged with respect to the system 20 of FIG. 2 so that a source of muons is available for exciting sample 100. Alternatively, naturally-occurring particles, such as muons showering Earth from cosmic ray interactions in the atmosphere may be used, in which case the system 20 may eliminate the need for a special source of muon particles.

Various electronic complements may be used to enhance the operation of the system 20. For example, a photomultiplier tube (PMT), such as is available from Hamamatsu Corporation, Japan, can be used, as is well known in the field, to amplify weak signals from the X-ray detector 150. In a typical mode of operation, a scintillation detector generates a weak light signal on detecting an emitted radiative emission, the PMT multiplies the weak light signal and generates a useful multiplied electronic output signal. Additionally, photodiodes can be used to amplify and/or detect events in the detector 150.

Further to the concepts presented above relating to atomic or electronic events, nuclear events can also be sensed and used to identify the material sample 100. For example, if the captured muon is also captured by the nucleus of the atom 102, additional by-products may be emitted from the atom 102, such as neutrons. These neutrons may also be detected using appropriate detectors to further confirm the identity of the sample 100. That is, a detector or set of detectors may be employed that detect at least one atomic (electron shell) characteristic X-ray in addition to at least one nuclear characteristic product (e.g., a neutron) to identify the material of sample 100.

A retarding layer or material can be applied to the detection device 10 to slow down or retard the incident subatomic particle(s) 130. This is helpful in some embodiments, for slowing the particle 130 down increases the probability it will be captured by the atom 102.

For material detection and identification in large containers 110, the detector apparatus 10 may comprise a chamber sufficiently large to hold an almost arbitrary payload, including a truck, shipping container, or other object of interest which can be driven or moved into the chamber. Specifically, a room-sized detector apparatus 10 can be constructed at a shipping port or customs station such that trucks and shipping containers are moved through the detector apparatus 10 before being admitted to the destination country or before being released by the country of origin. In so doing, it is possible to monitor and control the movement of prohibited materials such as special nuclear materials (SNM).

The system 20 can be made safe for commercial use. Since a source of ionizing radiation (e.g. imaging X-rays from X-ray screening devices) is not used, the system is safe for human operators who will not be exposed to a large dose of X-rays as conventional X-ray machine operators are. Furthermore, the system 20 is safe for screening containers which may have persons intentionally or accidentally located therein, where a danger exists from irradiating the persons with large doses of X-ray or radiographic radiation.

Figure 3:
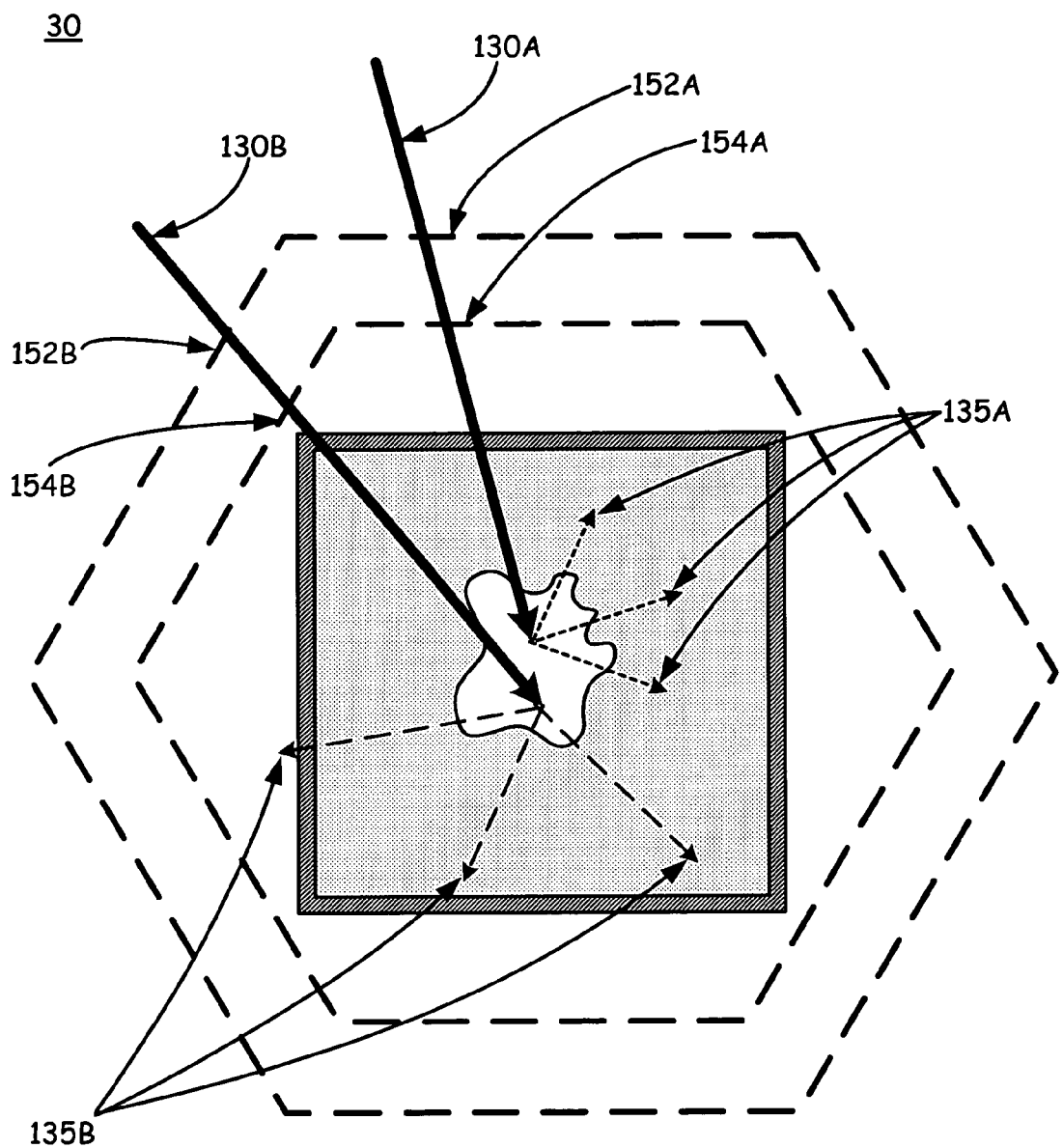
FIG. 3 illustrates an embodiment of a detector apparatus having multiple detector layers.

FIG. 3 illustrates a detector apparatus 30 having multiple layers. An outer layer including a detector segment 152 and an inner layer including a detector segment 154 are shown in the figure. Using this arrangement it is possible to localize the position of an atomic event because a spatial trajectory may be drawn for objects of known behavior. This "array" of detectors or detector segments can be considered a spatial correlator.

Incident muons 130 are known to travel in substantially straight lines. Therefore, an event correlated to muon 130A incident on sample 100 must lie along the line of travel of muon 130A, that line of travel being determined by correlating the outputs of detector segments 152A–154A when muon 130A passes through them. Note that X-rays 135A may be detected in the inner ring of detector segments 154, but may also pass through inner ring 154 and be detected by outer ring 152. In fact, the particles resulting from the interactions with the sample material can deposit energy in both the inner and outer detector rings 154, 152.

It should be appreciated that the illustrated detector rings can be generalized in space to three dimensions, e.g. as spherical or cubical enclosures, or any variation thereof, depending on the application at hand. It should also be appreciated that more than two layers or rings of detectors can be used for redundancy, added accuracy, coverage, sensitivity, etc., and that such layers or rings of detectors and detector segments can be of varying physical, material, geometrical, and electrical character.

If more than one muon, e.g. 130A and 130B, are incident on sample 100, and each muon causes a separate interaction to occur, a multi-dimensional localization of the position of the sample 100 becomes possible by triangulation. That is, linear co-location of sample 100 will be determined along more than one path, i.e. the paths passing through detector segments 152A–154A and 152B–154B, corresponding to muons 130A and 130B respectively. Temporal correlation associates X-rays 135A and 135B with the paths of muons 130A and 130B. A spatial correlator may be implemented in the processor 120 to compute the location or approximate location of sample 100. This spatial location of sample 100 is not limited by the temporal sequence of events from incident muons 130A and 130B.

Figure 4:
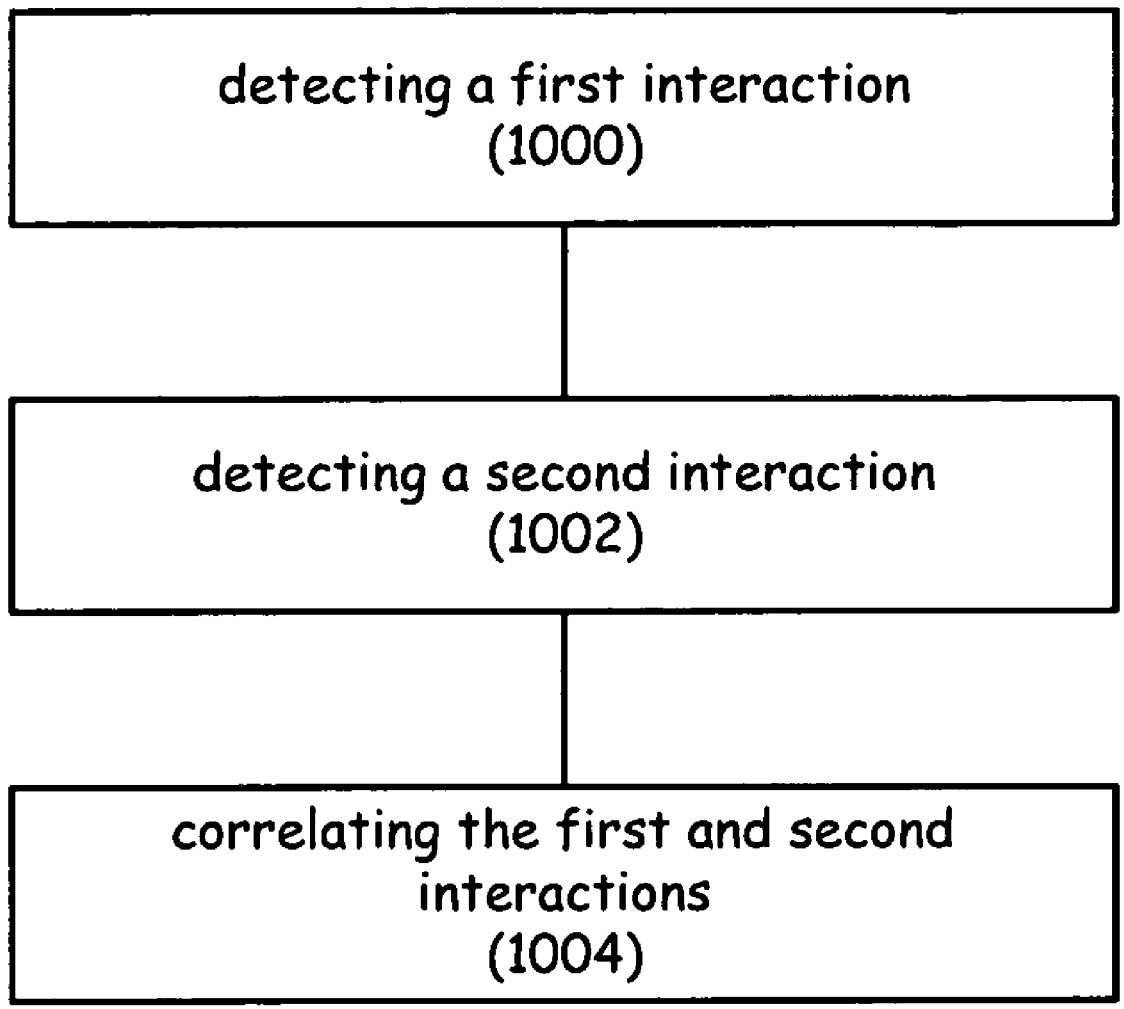
FIG. 4 illustrates an embodiment of a method for detection and identification of materials.

FIG. 4 illustrates an exemplary method for detecting and identifying a material in a container. At step 1000, a system detects a first interaction of a first emitted subatomic particle from de-excitation of an exotic atom and a detector; at step 1002, the system detects a second interaction of a second emitted subatomic particle emitted from de-excitation of the exotic atom and the detector; and at step 1004, the system correlates the first and second interactions of emitted subatomic particles in steps 1000 and 1002 to determine a correlation between the first and second interactions with the emitted subatomic particles.

Upon review of the present description and embodiments, those skilled in the art will recognize useful modifications and equivalent substitutions of various aspects of the present disclosure without departing from its essence. Thus, that disclosed herein is not meant to be limited by the embodiments described explicitly above.

What is claimed is:

1. A device for detecting correlated radiative emissions from the deexcitation of an exotic atom from a sample, comprising:
   a chamber that substantially contains the sample, the chamber being permeable to an incident subatomic particle entering the chamber and interacting with the sample, thereby causing the sample to emit a first emitted radiative emission and a second emitted radiative emission; and
   a detector that detects a first interaction with the first emitted radiative emission and detects a second interaction with the second emitted radiative emission.

2. The device of claim 1, further comprising a correlating system that correlates the first and second emitted radiative emissions to a single exotic atom in the sample in any of: a temporal correlator and a spatial correlator.

3. The device of claim 1, wherein the detector comprises a scintillation detector.

4. The device of claim 1, wherein the detector comprises a liquid scintillator.

5. The device of claim 1, further comprising a spectrometer that measures a spectral characteristic of at least one of the first and second emitted radiative emissions.

6. The device of claim 1, wherein the detector is segmented into a plurality of segments.

7. The device of claim 1, wherein at least one of the first and second emitted radiative emissions are produced in an electronic shell transition of an exotic atom in the sample.

8. The device of claim 1, wherein at least one of the first and second emitted radiative emissions are produced in a nuclear interaction of an exotic atom in the sample.

9. The device of claim 1, wherein the incident subatomic particle is negatively-charged.

10. The device of claim 9, wherein the particle is a muon.

11. The device of claim 9, wherein the particle is a pion.

12. The device of claim 1, further comprising a source of incident subatomic particles that excites the sample into an exotic state.

13. The device of claim 1, further comprising a processor that analyzes a characteristic of the emitted radiative emissions.

14. The device of claim 13, wherein the characteristic is an energy level.

15. The device of claim 13, further comprising a comparator that compares the characteristic of the emitted radiative emissions with a known characteristic.

16. The device of claim 1, further comprising a multiplier that multiplies a detected signal from the detector to generate a multiplied signal.

17. The device of claim 1, further comprising a correlator that correlates a first signal due to the first interaction and a second signal due to the second interaction.

18. The device of claim 17, wherein the correlator comprises a circuit that selectively determines occurrence of the first and second interactions within a temporal window.

19. The device of claim 1, further comprising an incident particle sensor that senses a trajectory of a radiative emission.

20. A method for determining a correlation between two emitted radiative emissions and a detector, comprising:
   (A) detecting a first radiative emission from deexcitation of an exotic atom;
   (B) detecting a second radiative emission from deexcitation of the exotic atom; and
   (C) correlating the first and second radiative emissions detected in (A) and (B) to determine a correlation between the first and second radiative emissions.

21. The method of claim 20, wherein at least one of the first and second radiative emissions is an energetic photon.

22. The method of claim 20, wherein at least one of the first and second emitted radiative emissions is a neutron.

23. The method of claim 20, wherein correlating the first and second radiative emissions comprises determining a temporal window within which the first and second radiative emissions occur.

24. The method of claim 20, further comprising providing exciting an atom to yield the first and second radiative emissions.

25. The method of claim 24, wherein exciting the atom comprises providing an incident subatomic particle to yield an exotic atom.

26. The method of claim 25, wherein the subatomic particle is a muon.

27. The method of claim 25, wherein the subatomic particle is a pion.

28. The method of claim 20, further comprising measuring a characteristic of the radiative emissions.

29. The method of claim 28, further comprising comparing the measured characteristic of the radiative emissions with a known characteristic.

30. An apparatus for correlating radiative emissions from an exotic atom, comprising:
   means for detecting a first radiative emission from deexciting the exotic atom;
   means for detecting a second radiative emission from deexciting the exotic atom; and
   means for correlating the first and second radiative emissions to yield a correlation between the first and second radiative emissions.

31. The apparatus of claim 30, wherein the means for detecting any of the first and second radiative emissions is an X-ray spectrometer.

32. The apparatus of claim 30, wherein the means for detecting any of the first and second radiative emissions is a neutron detector.

33. The apparatus of claim 30, further comprising means for determining a time difference between detection of the first and second radiative emissions.

34. The apparatus of claim 30, further comprising means for exciting the atom to an exotic state with an incident subatomic particle.

35. The apparatus of claim 30, wherein the subatomic particle is a muon.

36. The apparatus of claim 34, wherein the subatomic particle is a pion.

37. The apparatus of claim 30, further comprising means for measuring a characteristic of the radiative emissions.

38. The apparatus of claim 37, further comprising means for comparing the measured characteristic of the radiative emissions with a known characteristic.

* * * * *

UNITED STATES PATENT AND TRADEMARK OFFICE
CERTIFICATE OF CORRECTION

PATENT NO. : 7,015,475 B2  Page 1 of 1
APPLICATION NO. : 10/840144
DATED : March 21, 2006
INVENTOR(S) : Charles Hailey It is certified that error appears in the above-identified patent and that said Letters Patent is hereby corrected as shown below:

At column 10, line 1:

"claim 30" should read -- claim 34 --.

Signed and Sealed this

Twentieth Day of November, 2007

JON W. DUDAS
*Director of the United States Patent and Trademark Office*